US011227515B2

(12) United States Patent
Kim et al.

(10) Patent No.: US 11,227,515 B2
(45) Date of Patent: Jan. 18, 2022

(54) DISPLAY DEVICE

(71) Applicant: Samsung Display Co., LTD., Yongin-si (KR)

(72) Inventors: Tae-Chang Kim, Anyang-si (KR); Minseop Kim, Cheonan-si (KR); Changmin Park, Gwangmyeong-si (KR); Sungwoo Cho, Hwaseong-si (KR)

(73) Assignee: SAMSUNG DISPLAY CO., LTD., Gyeonggi-Do (KR)

( * ) Notice: Subject to any disclaimer, the term of this patent is extended or adjusted under 35 U.S.C. 154(b) by 0 days.

(21) Appl. No.: 16/989,955

(22) Filed: Aug. 11, 2020

(65) Prior Publication Data
US 2021/0201710 A1    Jul. 1, 2021

(30) Foreign Application Priority Data
Dec. 30, 2019    (KR) .......................... 10-2019-0177458

(51) Int. Cl.
*G09F 9/30*    (2006.01)
*G06F 1/16*    (2006.01)

(52) U.S. Cl.
CPC ............ *G09F 9/301* (2013.01); *G06F 1/1616* (2013.01); *G06F 1/1626* (2013.01); *G06F 1/1641* (2013.01)

(58) Field of Classification Search
CPC ...... G09F 9/301; G06F 1/1616; G06F 1/1626; G06F 1/1641; G06F 1/1652
See application file for complete search history.

(56) References Cited

U.S. PATENT DOCUMENTS 9,420,215 B2    8/2016    Jean et al.
9,983,424 B2 *  5/2018    Kim .................... H01L 51/0097
10,345,856 B2    7/2019   Song
(Continued)

FOREIGN PATENT DOCUMENTS

KR          101325913 B1    10/2013
KR       1020160017843 A     2/2016
(Continued)

OTHER PUBLICATIONS

European Search Report for European Patent Application No. 20212612.4 dated May 14, 2021.

*Primary Examiner* — Abhishek M Rathod
(74) *Attorney, Agent, or Firm* — Cantor Colburn LLP

(57) ABSTRACT

A display device includes a display module including: a folding area, and first and second non-folding areas; a first support member bendable together with the display module and including: a bending area corresponding to the folding area, and first and second non-bending areas corresponding to the first and second non-folding areas; and a support layer facing the display module with the first support member therebetween, and including: a second support member in the bending area and the first and second non-bending areas; a first support plate facing the first support member with the second support member therebetween and in the bending area and the first non-bending area; and a second support plate facing the first support member with the second support member therebetween and in the bending area and the second non-bending area. The second support plate is disconnected from the first support plate at the bending area.

17 Claims, 11 Drawing Sheets

(56) References Cited

U.S. PATENT DOCUMENTS

| | | | |
|---|---|---|---|
| 10,620,668 B2* | 4/2020 | Park | G06F 1/1681 |
| 10,831,241 B1* | 11/2020 | Watamura | G06F 1/1681 |
| 2016/0209874 A1* | 7/2016 | Choi | G06F 1/1641 |
| 2018/0190936 A1* | 7/2018 | Lee | B32B 3/18 |
| 2018/0343756 A1* | 11/2018 | Lin | G02F 1/16753 |
| 2019/0036068 A1* | 1/2019 | Kim | G06F 1/1641 |
| 2019/0204867 A1* | 7/2019 | Song | G06F 1/1616 |
| 2019/0305238 A1* | 10/2019 | Shin | H01L 27/3244 |
| 2019/0334114 A1* | 10/2019 | Park | H01L 51/0097 |
| 2019/0346887 A1* | 11/2019 | Park | G06F 1/1681 |
| 2019/0357366 A1* | 11/2019 | Choi | B32B 27/365 |
| 2020/0019212 A1* | 1/2020 | Jung | G06F 1/1652 |
| 2020/0022267 A1* | 1/2020 | Han | B32B 27/302 |
| 2020/0133338 A1* | 4/2020 | Han | G06F 1/1641 |
| 2020/0133344 A1* | 4/2020 | Park | H01L 51/5253 |
| 2020/0137900 A1* | 4/2020 | Park | H05K 5/03 |
| 2020/0204666 A1* | 6/2020 | Hong | G06F 1/1616 |
| 2020/0209925 A1* | 7/2020 | Paek | G06F 1/1626 |
| 2020/0209998 A1* | 7/2020 | Shin | G06F 3/044 |
| 2020/0259115 A1* | 8/2020 | Shin | H01L 51/5246 |
| 2020/0260596 A1* | 8/2020 | Park | H01L 51/5246 |
| 2020/0344897 A1* | 10/2020 | Kim | G06F 1/1641 |
| 2021/0191459 A1 | 6/2021 | Kim et al. | |

FOREIGN PATENT DOCUMENTS

| | | |
|---|---|---|
| KR | 1020160144912 A | 12/2016 |
| KR | 1020170064165 A | 6/2017 |
| KR | 1020180062272 A | 6/2018 |
| KR | 1020190001864 A | 1/2019 |
| KR | 1020190003257 A | 1/2019 |
| KR | 1020210079461 A | 6/2021 |

* cited by examiner

DISPLAY DEVICE

This application claims priority to Korean Patent Application No. 10-2019-0177458, filed on Dec. 30, 2019, and all the benefits accruing therefrom under 35 U.S.C. § 119, the entire contents of which are hereby incorporated by reference.

BACKGROUND

(1) Field

The present disclosure herein relates to a display device, and more particularly, to a display device having improved product reliability.

(2) Description of the Related Art

Display devices allow various images to be displayed on a display screen and provide a user with the images. Generally, information is displayed within an assigned region of the screen by the display devices. Flexible display devices including a foldable flexible display panel have been developed. The flexible display devices may be bent, rolled, or curved unlike rigid display devices. The flexible display devices having a diversely changeable shape are not limited to existing screen sizes and thus may be transportable. Therefore, the user convenience may be improved.

SUMMARY

The present disclosure provides a display device having improved product reliability.

An embodiment of the invention provides a display device including: a display module including: a folding area, and first and second non-folding areas; a first support member bendable together with the display module and including: a bending area corresponding to the folding area, and first and second non-bending areas corresponding to the first and second non-folding areas; and a support layer facing the display module with the first support member therebetween, and including: a second support member in the bending area and the first and second non-bending areas; a first support plate facing the first support member with the second support member therebetween and in the bending area and the first non-bending area; and a second support plate facing the first support member with the second support member therebetween and in the bending area and the second non-bending area. The second support plate is disconnected from the first support plate at the bending area.

In an embodiment, the bending area may be defined as a plurality of opening portions spaced a predetermined distance from each other.

In an embodiment, the first support member, the first support plate, and the second support plate may have the same thickness.

In an embodiment, each of the first support member, the first support plate, and the second support plate may have a thickness of about 0.08 millimeter (mm) to about 0.15 mm.

In an embodiment, along a same direction, a dimension of the second support member may be smaller than a dimension of the first support member, and may include a film or a cushion.

In an embodiment, the second support member may be disconnected at the bending area to define a first portion and a second portion spaced apart from each other at the bending area, and the first portion may correspond to the first support plate and the second portion may correspond to the second support plate.

In an embodiment, each of the first portion and the second portion may include metal.

In an embodiment, the display device may further includes a first adhesive member between the second support member and the first support plate and corresponding to the first non-bending area, a second adhesive member between the second support member and the second support plate and corresponding to the second non-bending area, and a third adhesive member facing the first adhesive member with the second support member therebetween and facing the second adhesive member with the second support member therebetween.

In an embodiment, the first support member which is unbent may have a flat shape, and the first support member which is bent at the bending area may dispose the first non-folding area and the second non-folding area facing each other.

In an embodiment, the display device may further include a first cover member and a second cover member spaced apart from each other at the bending area, the first cover member may correspond to the first support plate and the second cover member may correspond to the second support plate.

In an embodiment, the first cover member and the second cover member may be spaced apart from each other by a same distance between the first support plate and the second support plate.

In an embodiment, the display device may further include a first adhesive layer and a second adhesive layer each coplanar with the second support member and spaced apart from each other by the second support member, the first adhesive layer may be the first non-bending area and between the first cover member and the first support member, and the second adhesive layer may be in the second non-bending area and between the second cover member and the first support member.

In an embodiment, each of the first adhesive layer and the second adhesive layer may have a thickness equal to a sum of the thickness of the second support member and the thickness of the first support plate or a sum of the thickness of the second support member and the thickness of the second support plate.

In an embodiment of the invention, a display device includes: a display module including a folding area and a first non-folding area and a second non-folding area; a first support member bendable together with the display module, the first support member including: a bending area corresponding to the folding area, a first non-bending area corresponding to the first non-folding area, a second non-bending area corresponding to the second non-folding area, and a plurality of openings defined in the first support member at the bending area thereof and spaced apart from each other along the bending area, where openings which are spaced furthest apart from each other define the bending area of the first support member; and a second support member facing the display module with the first support member therebetween, where the second support member is in the bending area, the first non-bending area and the second non-bending area.

In an embodiment, the second support member may be disconnected at the bending area to define a first portion and a second portion spaced apart from each other at the bending area, the first portion may be in the bending area and the first non-bending area, and the second portion may be in the bending area and the second non-bending area.

In an embodiment, the display device may further include a cover layer facing the first support member with the second support member therebetween. The cover layer may be disconnected at the bending area to define a first cover member and a second cover member spaced apart from each other at the bending area, the first cover member and the second cover member may each include a top surface facing the second support member, the first portion of the second support member may form an interface with the top surface of the first cover member, and the second portion of the second support member may form an interface with the top surface of the second cover member.

In an embodiment, each of the first portion and the second portion may include metal.

In an embodiment, the first support member may include a bottom surface facing the second support member, and the first portion and the second portion of the second support member may respectively form an interface with the bottom surface of the first support member.

In an embodiment of the invention, a display device includes: a display module including: a folding area at which the display module is foldable, and a first non-folding area and a second non-folding area; a first support member bendable together with the display module, the first support member including: a bending area corresponding to the folding area, a first non-bending area corresponding to the first non-folding area, and a second non-bending area corresponding to the second non-folding area; and a cover layer facing the display module with the first support member therebetween, the cover layer including a first cover member in the first non-bending area and the bending area; a second cover member in the second non-bending area and the bending area, the second cover member disconnected from the first cover member at the bending area; a first adhesive layer which is in the first non-bending area and coplanar with the first cover member, where the first adhesive layer in the first non-bending area is between the first support member and the first cover member; and a second adhesive layer which is in the second non-bending area and coplanar with the second cover member, where the second adhesive layer in the second non-bending area is between the first support member and the second cover member.

In an embodiment, the first cover member may include a first protrusion extended toward the first support member, where the first protrusion is coplanar with the first adhesive layer and in each of the bending area and the first non-bending area, and the second cover member may include a second protrusion extended toward the first support member, where the second protrusion is coplanar with the second adhesive layer and in each of the bending area and the second non-bending area.

BRIEF DESCRIPTION OF THE DRAWINGS

The accompanying drawings are included to provide a further understanding of the invention, and are incorporated in and constitute a part of this specification. The drawings illustrate exemplary embodiments of the invention and, together with the description, serve to explain principles of the invention. In the drawings.

DETAILED DESCRIPTION

Figure 1A:
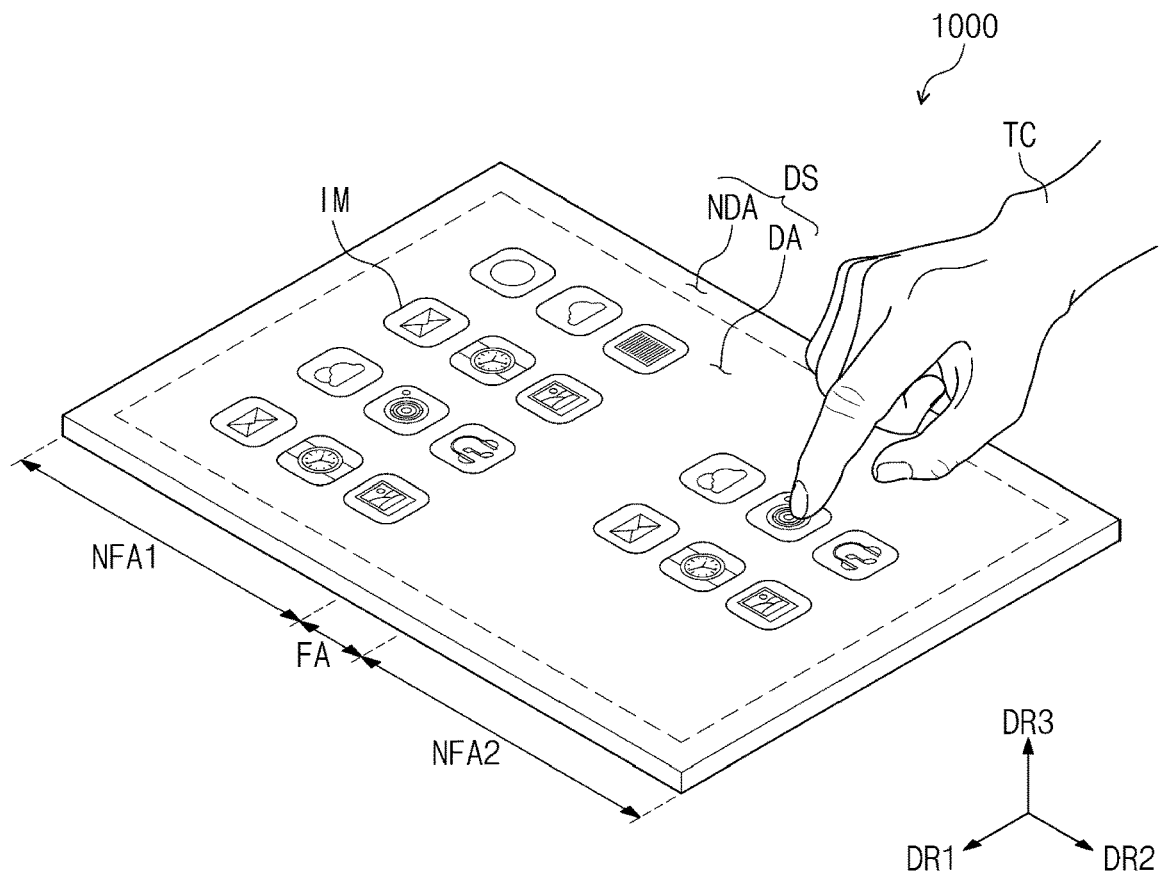
FIG. 1A is a perspective view of an embodiment of a display device.

In this specification, when a component (or a region, a layer, a portion, or the like) is referred to as being related to another component such as being "on," "connected to" or "coupled to" another component, it may be directly disposed/connected/coupled to another component, or an intervening third component may also be disposed therebetween. In contrast, when a component is referred to as being related to another component such as being "directly on," "directly connected to" or "directly coupled to" another component, no intervening third component is disposed therebetween.

Like numbers refer to like components throughout. Also, in the drawings, the thicknesses, ratios, and dimensions of the components are exaggerated for effectively describing the technical features.

The terminology used herein is for the purpose of describing particular embodiments only and is not intended to be limiting. As used herein, "a", "an," "the," and "at least one" do not denote a limitation of quantity, and are intended to include both the singular and plural, unless the context clearly indicates otherwise. For example, "an element" has the same meaning as "at least one element," unless the context clearly indicates otherwise. "At least one" is not to be construed as limiting "a" or "an." "Or" means "and/or." "And/or" includes one or more combinations which may be defined by the associated components.

Although the terms such as first and second are used to describe various components, these components should not be limited by these terms. The terms are only used to distinguish one component from other components. For example, a first component may be referred to as a second component, and similarly, a second component may be referred to as a first component without departing from the scope of the invention concept. The expression of a singular form includes plural forms unless definitely indicating a particular case in terms of the context.

Also, terms of "below," "on a lower side," "above," "on an upper side" or the like may be used to describe the relationships of the components illustrated in the drawings. These terms have a relative concept, and are described on the basis of the directions illustrated in the drawings.

It should be understood that the term of "comprise," "have" or the like intends to specify the presence of a feature, a fixed number, a step, an operation, an element, a component, or a combination thereof described in the specification, but does not exclude the possibility of presence or addition of one or more other features, fixed numbers, steps, operations, elements, components, or combinations thereof.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" can mean within one or more standard deviations, or within ±30%, 20%, 10% or 5% of the stated value.

Unless otherwise defined, all terms (including technical and scientific terms) used herein have the same meaning as commonly understood by one of ordinary skill in the art to which the present disclosure belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Exemplary embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

Hereinafter, embodiments of the invention will be described with reference to the accompanying drawings.

Figure 1B:
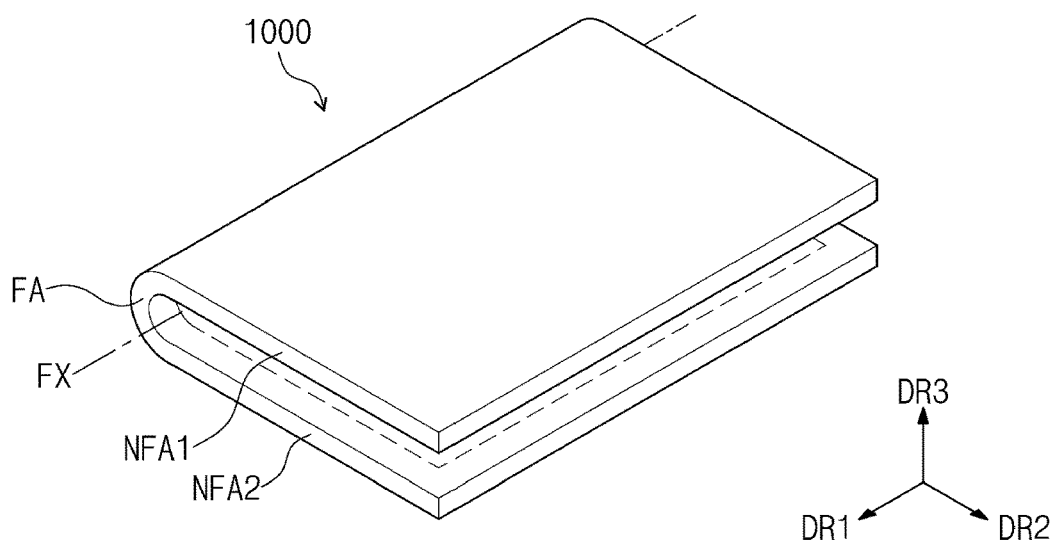
FIG. 1B is a view illustrating an embodiment of the display device illustrated in FIG. 1A which is folded.

FIG. 1A is a perspective view of an embodiment of a display device 1000. FIG. 1B is a view illustrating an embodiment of the display device 1000 illustrated in FIG. 1A, which is folded.

Referring to FIG. 1A and FIG. 1B, a display device 1000 may be a foldable display device. The display device 1000 may be used in large scale electronic apparatuses such as televisions and display monitors, as well as, in small-to-medium scale electronic apparatuses such as mobile phones, tablets, vehicular navigation devices, game consoles and smart watches.

A top surface of the display device 1000 may be defined as a display surface DS. The display device 1000 which is unfolded may dispose the display surface DS in a plane defined by a first direction DR1 and a second direction DR2 which cross each other. Various components of the display device 1000 which is unfolded may be disposed in a plane parallel to the plane defined by the first direction DR1 and the second direction DR2.

A thickness of the display device 1000 and various components thereof is defined along a third direction DR3 (e.g., thickness direction) which crosses each of the first direction DR1 and the second direction DR2.

The display surface DS may include a display area DA and a non-display area NDA which is adjacent to the display area DA. The display area DA is a planar area at which an image IM is displayed, and the non-display area NDA is a planar area at which the image IM is not displayed. In FIG. 1A, application icons are illustrated as one example of the image IM. Various components of the display device 1000 may include a display area DA and a non-display area NDA corresponding to those described above for the display device 1000.

The display area DA may have a tetragonal planar shape. The non-display area NDA may surround the display area DA. However, the invention is not limited thereto, and the planar shape of the display area DA and the planar shape of the non-display area NDA may be relatively designed.

In the display device 1000, a first non-folding area NFA1, a folding area FA and a second non-folding area NFA2 may be defined in order along the second direction DR2. That is, the folding area FA may be defined between the first non-folding area NFA1 and the second non-folding area NFA2. A single one of each of the folding area FA, the first non-folding area NFA1 and the second non-folding area NFA2 are illustrated in FIGS. 1A and 1B, but the number of these areas is not limited thereto. The display device 1000 may include more than two, for example, a plurality of non-folding areas and a plurality of folding areas which are disposed between the non-folding areas.

The display device 1000 and various component thereof may be bendable or foldable at the folding area FA. The display device 1000 and various component thereof may be non-bendable or non-foldable at the first non-folding area NFA1 and the second non-folding area NFA2, or may remain unbent, unfolded or flat even within the display device 1000 which is bent or folded at the folding area FA.

The display device 1000 may be foldable with respect to a folding axis FX. That is, the folding area FA may be bendable with respect to the folding axis FX. The folding axis FX may extend along the first direction DR1. The folding axis FX may be defined as a short axis parallel to short sides of the display device 1000 along long sides and short sides thereof.

Thus, the display device 1000 which is folded, disposes a portion of a display surface DS at the first non-folding area NFA1 and a portion of the display surface DS at the second non-folding area NFA2 facing each other. Thus, the display surface DS may not be exposed to the outside in the display device 1000 which is folded. However, this is merely an example, and the invention is not limited thereto. In an embodiment, the display device 1000 which is folded, disposes a portion of the display surface DS at the first non-folding area NFA1 and a portion of the display surface DS at the second non-folding area NFA2 facing in directions opposite to each other. Thus, the display surface DS may be exposed to or face outside the display device 1000 in the display device 1000 which is folded.

Figure 2A:
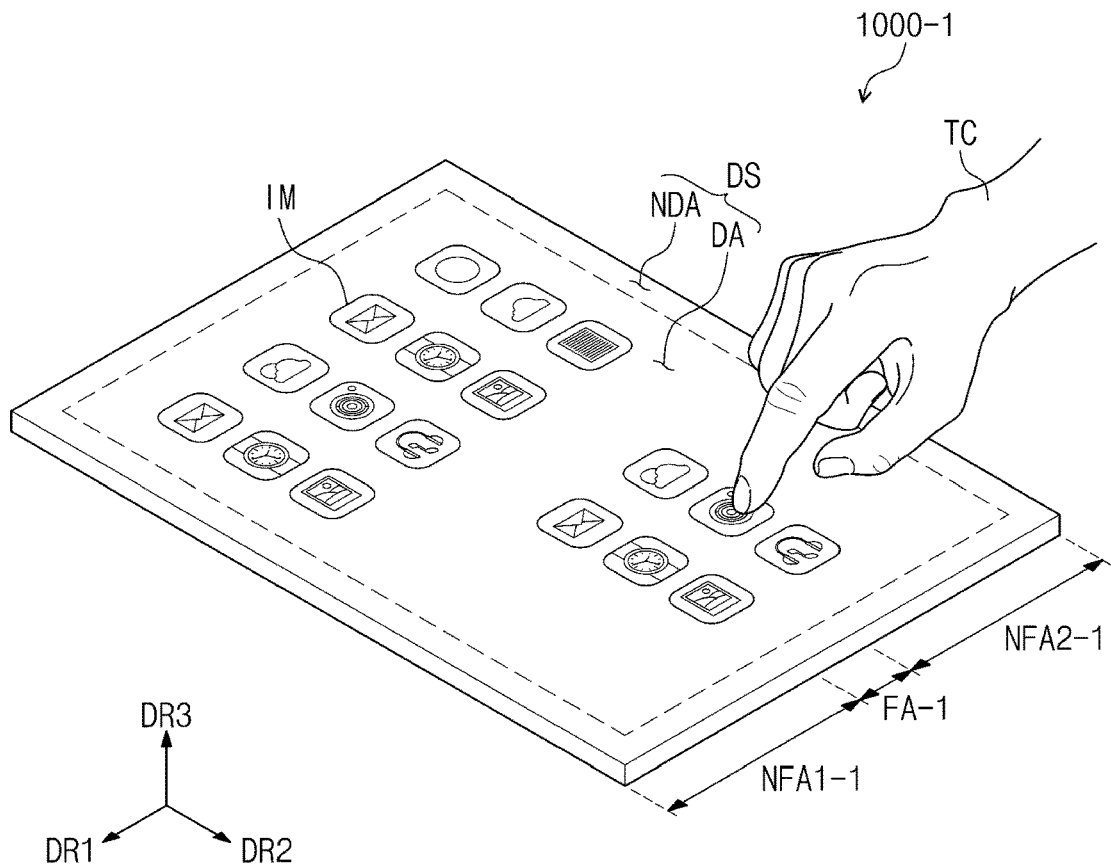
FIG. 2A is a perspective view of an embodiment of a display device.
Figure 2B:
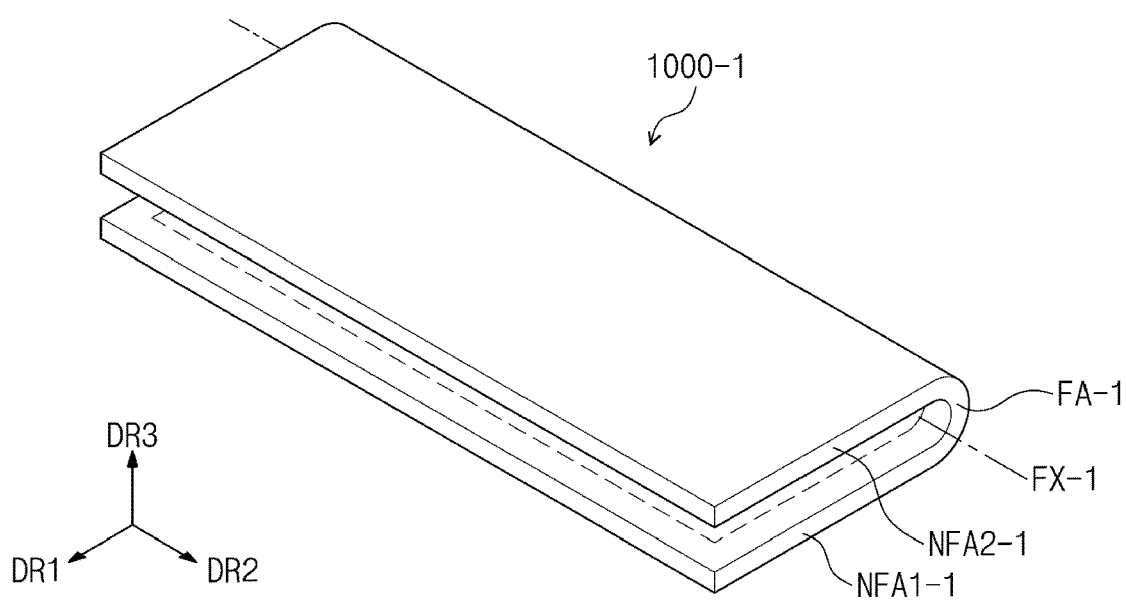
FIG. 2B is a view illustrating an embodiment of the display device illustrated in FIG. 2A which is folded.

FIG. 2A is a perspective view of an embodiment of a display device 1000-1. FIG. 2B is a view illustrating an embodiment of the display device 1000-1 illustrated in FIG. 2A, which is folded.

Referring to FIG. 2A and FIG. 2B, in a display device 1000-1, a first non-folding area NFA1-1, a folding area FA-1 and a second non-folding area NFA2-1 may be defined in order along a first direction DR1. The folding area FA-1 may be defined between the first non-folding area NFA1-1 and the second non-folding area NFA2-1.

The display device 1000-1 may be foldable with respect to a folding axis FX-1. That is, the folding area FA-1 may be bendable with respect to the folding axis FX-1. The folding axis FX-1 may extend along a second direction DR2. The folding axis FX-1 may be defined as a long axis parallel to long sides of the display device 1000-1.

Hereinafter, a structure of the display device 1000 which is folded with respect to the short axis will be described. However, the invention is not limited thereto, and structures described hereinafter may be also applied to the display device 1000-1 which is folded with respect to the long axis.

Figure 3:
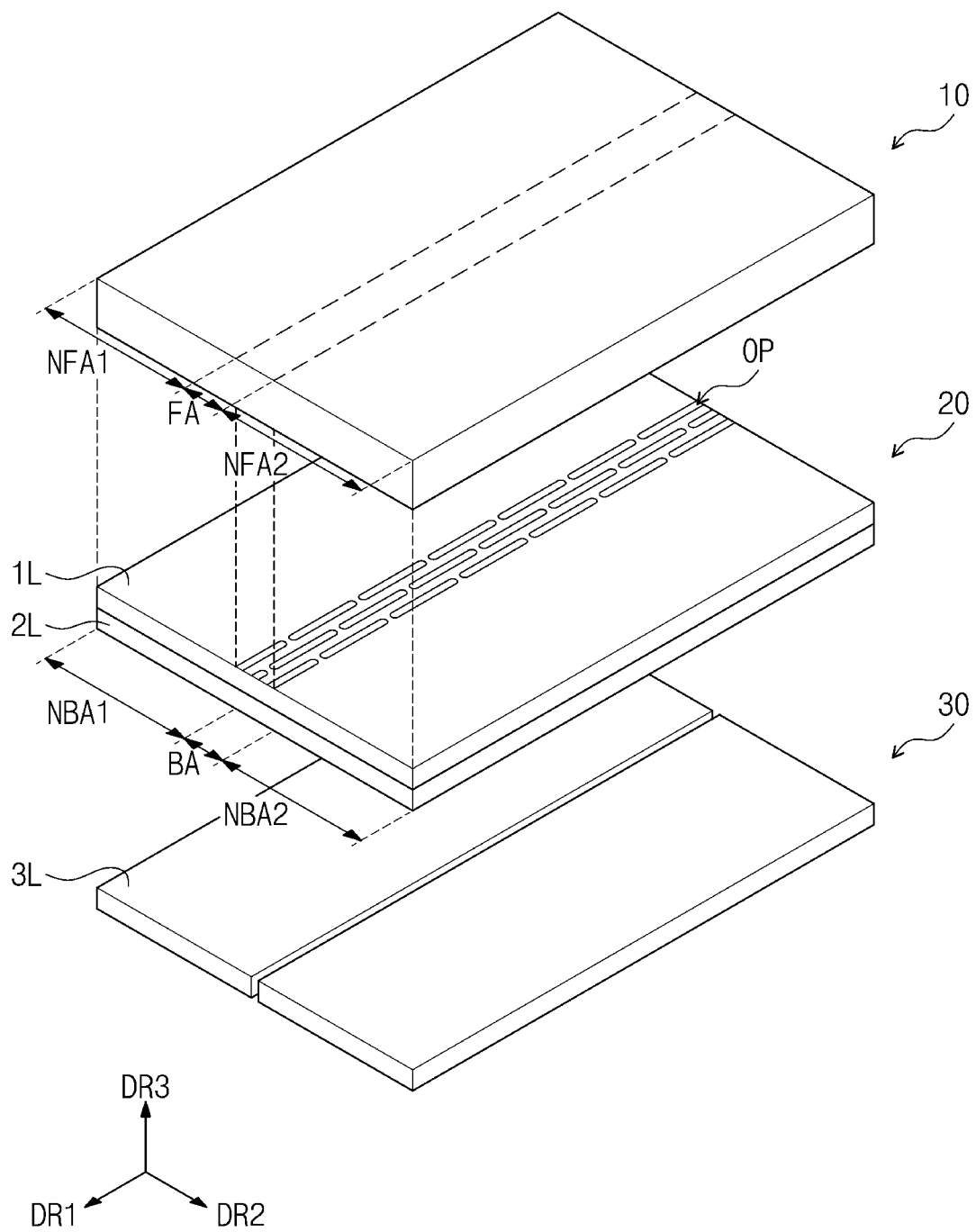
FIG. 3 is an exploded perspective view of an embodiment of a display device.

FIG. 3 is an exploded perspective view of an embodiment of a display device 1000.

Referring to FIG. 3, a display device 1000 may include a first module 10, a second module 20 and a third module 30. The first module 10, the second module 20 and the third module 30 may be coupled to each other by an adhesive or bonding agent (not shown), in order along the third direction DR3 as shown in FIG. 3. In an embodiment, the first module 10 may be disposed directly on the second module 20, and the second module 20 may be disposed directly on the third module 30, without being limited thereto.

The first module 10 includes a display module and a plurality of functional layers. The first module 10 may include a display module 100. The first module 10 may include a folding area FA, a first non-folding area NFA1 and a second non-folding area NFA2. The first module 10 will be described in more detail in FIG. 4.

The second module 20 includes a first layer 1L and a second layer 2L. The first layer 1L may include a first support member SM1. In an embodiment, the second layer 2L may include a second support member SM2, a first support plate SP1 and a second support plate SP2 which together define a support layer or a plate layer. In an embodiment, the second layer 2L may include only the second support member SM2. The second layer 2L may include a first adhesive layer AL1 and a second adhesive layer AL2. The second module 20 may collectively define a supporter.

The second module 20 may include a bending area BA, a first non-bending area NBA1 and a second non-bending area NBA2. The second module 20 and various component thereof may be bendable or foldable at the bending area BA. The second module 20 and various components thereof may be non-bendable or non-foldable at the first non-bending area NBA1 and the second non-bending area NBA2, or may remain unbent, unfolded or flat even within the second module 20 which is bent or folded at the bending area BA. The second module 20 may be bendable or foldable together with the first module 10 and/or the third module 30.

An opening portion OP or opening provided in plurality (e.g., a plurality of opening portions OP) are arranged to be spaced at a predetermined distance from each other. The plurality of opening portions OP may correspond to and/or define the bending area BA. The bending area BA overlaps or corresponds to the folding area FA. The first non-bending area NBA1 may overlap or correspond to the first non-folding area NFA1, and the second non-bending area NBA2 may overlap or correspond to the second non-folding area NFA2.

The third module 30 includes functional components which provide a function and/or operation of the first module 10 or structural components related to the first module 10 and/or the second module 20 within the display device 1000 as a whole. The third module 30 may include one or more of a camera module, a main board, a battery and a housing. The third module 30 may include a third layer 3L. In an embodiment, a first cover member CM1 and a second cover member CM2 may be provided in the third layer 3L of the third module 30. The first cover member CM1 together with the second cover member CM2 may define a cover layer. The third module 30 may be bendable or foldable together with the first module 10 and/or the second module 20.

The display device 1000 which is unfolded disposes the first cover member CM1 and the second cover member CM2 spaced apart from each other. The first to third layers 1L, 2L and 3L may be respectively coupled to each other by an adhesive or bonding agent (not shown), along the third direction DR3. In an embodiment, the first layer 1L may be disposed directly on the second layer 2L, and the second layer 2L may be disposed directly on the third layer 3L, without being limited thereto.

Figure 4:
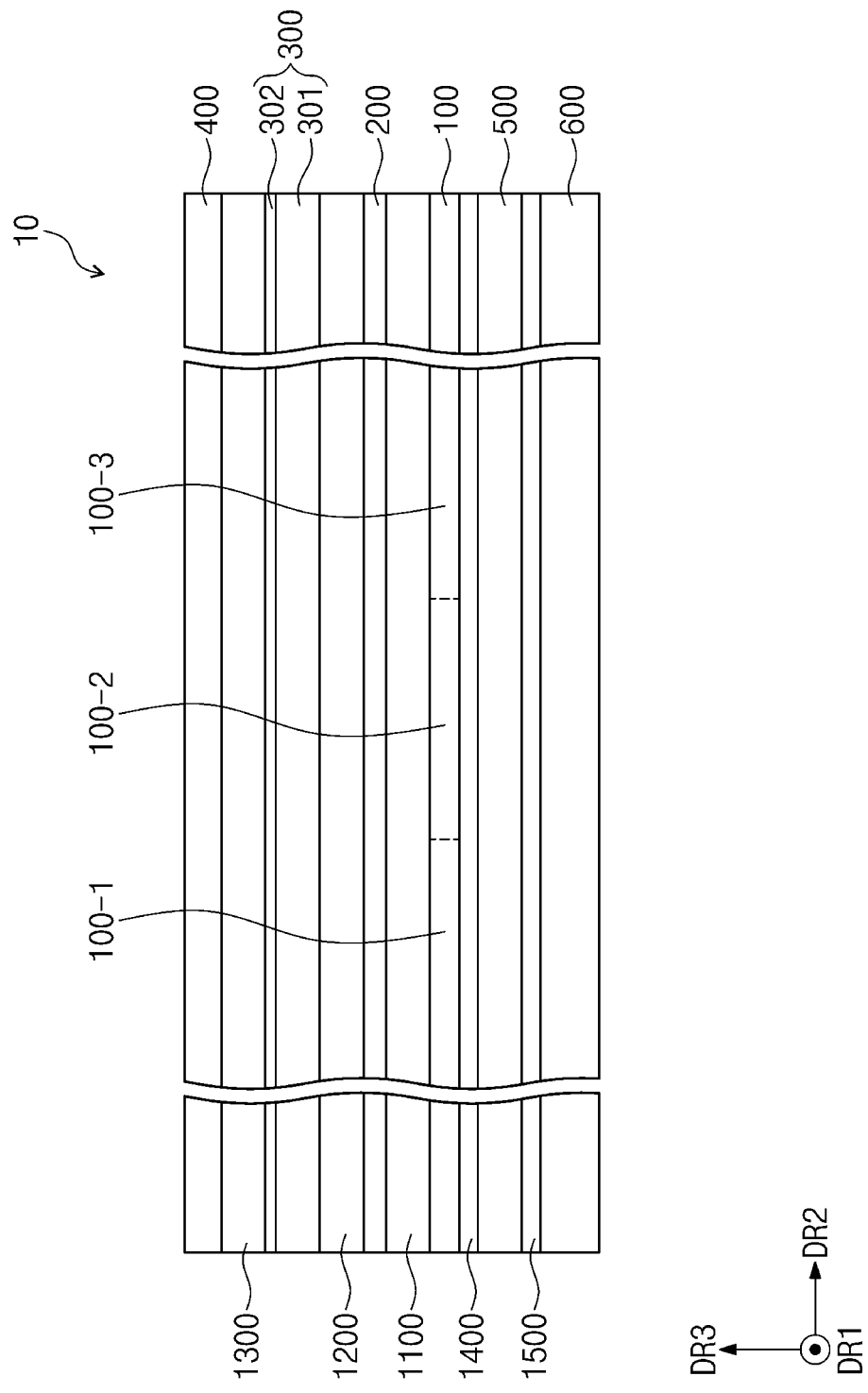
FIG. 4 is a cross-sectional view of an embodiment of a first module of a display device.

FIG. 4 is a cross-sectional view of an embodiment of a first module 10 of a display device 1000.

Referring to FIG. 4, a first module 10 may include a display module 100, an anti-reflection layer 200, a window 300, an upper protective film 400, a lower protective film 500 and a cushion layer 600.

The display module 100 may generate and/or display the image IM (see FIG. 1A). The display module 100 may sense an external input TC (see FIG. 1A). The external input TC may include various types of external inputs such as a portion of a user's body, light, heat, a pen or pressure. In FIG. 1A, the external input TC is illustrated as the user's hand applied to the display surface DS. However, this is merely illustrated as an example, and as described above, the external input TC may be provided as various forms. Also, the external input TC applied to the side surface or the bottom surface of the display module 100 according to the structure of the display device 1000 may be sensed, and is not limited to any one embodiment.

The display module 100 may include a display panel which generates and/or displays an image IM and an input sensing layer which acquires coordinate information about an external input TC.

The display panel may be a light emitting-type display panel, but is not particularly limited thereto. In an embodiment, for example, the display panel may be an organic light emitting display panel or a quantum-dot light emitting display panel. A light emitting layer of the organic light emitting display panel may include an organic light emitting material. A light emitting layer of the quantum-dot light emitting display panel may include quantum dots, quantum rods or the like.

The input sensing layer may be disposed directly on the display panel. In an embodiment, for example, the input sensing layer may be provided or formed directly on the display panel through a continuous process in a method of manufacturing the display device 1000. The input sensing layer may include a plurality of insulating layers and a plurality of conductive layers. The plurality of conductive layers may constitute a sensing electrode for sensing an external input TC, a sensing wire connected to the sensing electrode, and a sensing pad connected to the sensing wire. The input sensing layer may sense the external input TC by using a mutual capacitance method and/or a self-capacitance method. However, the method for sensing the external input TC is not limited to the above-described examples.

The display module 100 includes a first area 100-1, a second area 100-2 and a third area 100-3 in order. The first area 100-1 may correspond to the first non-folding area NFA1 of FIG. 1A, the second area 100-2 may correspond to the folding area FA of FIG. 1A, and the third area 100-3 may correspond to the second non-folding area NFA2 of FIG. 1A. That is, each of the first area 100-1 and the third area 100-3 may be a planar area at which the display module 100 is non-foldable, and the second area 100-2 may be a planar area at which the display module 100 is foldable.

The anti-reflection layer 200 may be disposed above the display module 100. The reflectivity of external light incident from outside of the anti-reflection layer 200 may be reduced by the anti-reflection layer 200. The anti-reflection layer 200 may include a phase retarder and a polarizer. The phase retarder may be a film type or a liquid crystal coating type and may include a $\lambda/2$ phase retarder and/or a $\lambda/4$ phase retarder. The polarizer may also be a film type or a liquid crystal coating type. The film type may include an elongated synthetic resin film, and the liquid crystal coating type may include liquid crystals arranged in a predetermined arrangement. The phase retarder and the polarizer may further include protective films.

Also, the anti-reflection layer 200 may include color filters. The color filters have a predetermined arrangement. By considering light emission colors of pixels provided in the display panel, the arrangement of the color filters may be determined. The anti-reflection layer 200 may further include a black matrix adjacent to the color filters.

Also, the anti-reflection layer 200 may include a destructive interference structure. In an embodiment, for example, the destructive interference structure may include a first reflection layer and a second reflection layer which are disposed in different layers from each other. First reflection light and second reflection light, which are reflected respectively from the first reflection layer and the second reflection layer, may be destructively interfered, and thus the reflectivity of external light is reduced.

An adhesive layer 1100 (e.g., third adhesive layer) may be disposed between the display module 100 and the anti-reflection layer 200. The display module 100 and the anti-reflection layer 200 may be coupled to each other by the adhesive layer 1100. In an embodiment, the adhesive layer 1100 may be omitted. The various adhesive layers described in the present specification may include a general bonding agent or adhesive material. In an embodiment, for example, each of the various adhesive layers may be a pressure sensitive adhesive ("PSA"), an optical clear adhesive ("OCA") or an optical clear resin ("OCR").

The window 300 may be disposed above the anti-reflection layer 200. The window 300 may include a base layer 301 and a functional coating layer 302. The base layer 301 may include a glass substrate and/or a synthetic resin film. In an embodiment, for example, the base layer 301 may include a polyimide film. The base layer 301 is not limited to a single layer. The base layer 301 may include two or more films coupled to each other by an adhesive member. The functional coating layer 302 may include at least one of an anti-fingerprint layer, an anti-reflection layer and a hard coating layer.

An adhesive layer 1200 (e.g., fourth adhesive layer) may be disposed between the window 300 and the anti-reflection layer 200. In an embodiment, the adhesive layer 1200 may be omitted.

The upper protective film 400 may be disposed above the window 300. The impact resistance characteristics of the display device 1000 may be enhanced by adding the upper protective film 400. The upper protective film 400 may be a polymer film or a tempered glass film. The upper protective film 400 may form an upper surface or outer surface of the first module 10. An adhesive layer 1300 (e.g., fifth adhesive layer) may be disposed between the upper protective film 400 and the window 300. In an embodiment, the adhesive layer 1300 may be omitted. Also, in an embodiment, the upper protective film 400 may be omitted.

The lower protective film 500 may be disposed below the display module 100. The lower protective film 500 may be a layer for protecting the bottom surface of the display module 100. The lower protective film 500 may include a synthetic resin film, for example, which may be a polyimide film or a polyethylene terephthalate film. However, this is merely an example, and the lower protective film 500 is not limited to the above-described example. An adhesive layer 1400 (e.g., sixth adhesive layer) may be disposed between the lower protective film 500 and the display module 100.

The cushion layer 600 may be disposed below the lower protective film 500. The cushion layer 600 may include sponge, foam, a urethane resin, or the like. The cushion layer 600 may form a lower surface or outer surface of the first module 10. An adhesive layer 1500 (e.g., seventh adhesive layer) may be disposed between the lower protective film 500 and the cushion layer 600.

FIGS. 5A to 5D are cross-sectional views of embodiments of a display device 1000.

Figure 5A:
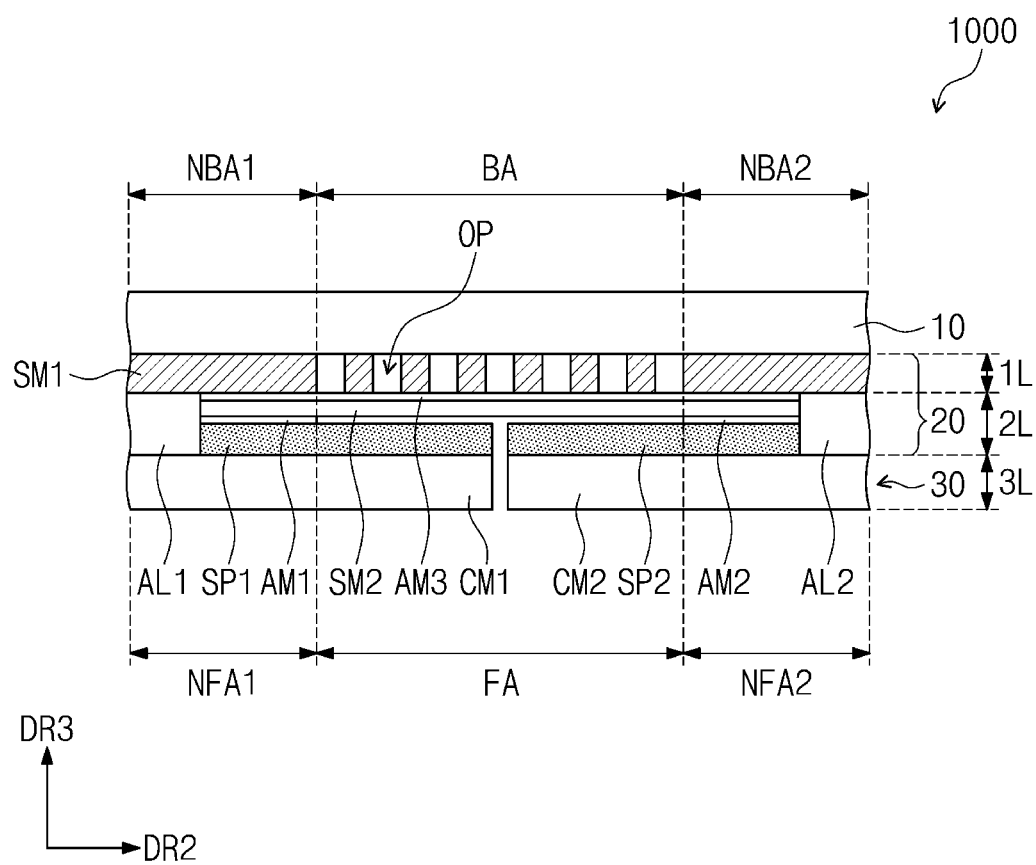
FIGS. 5A to 5D are cross-sectional views of embodiments of a display device.
Figure 5B:
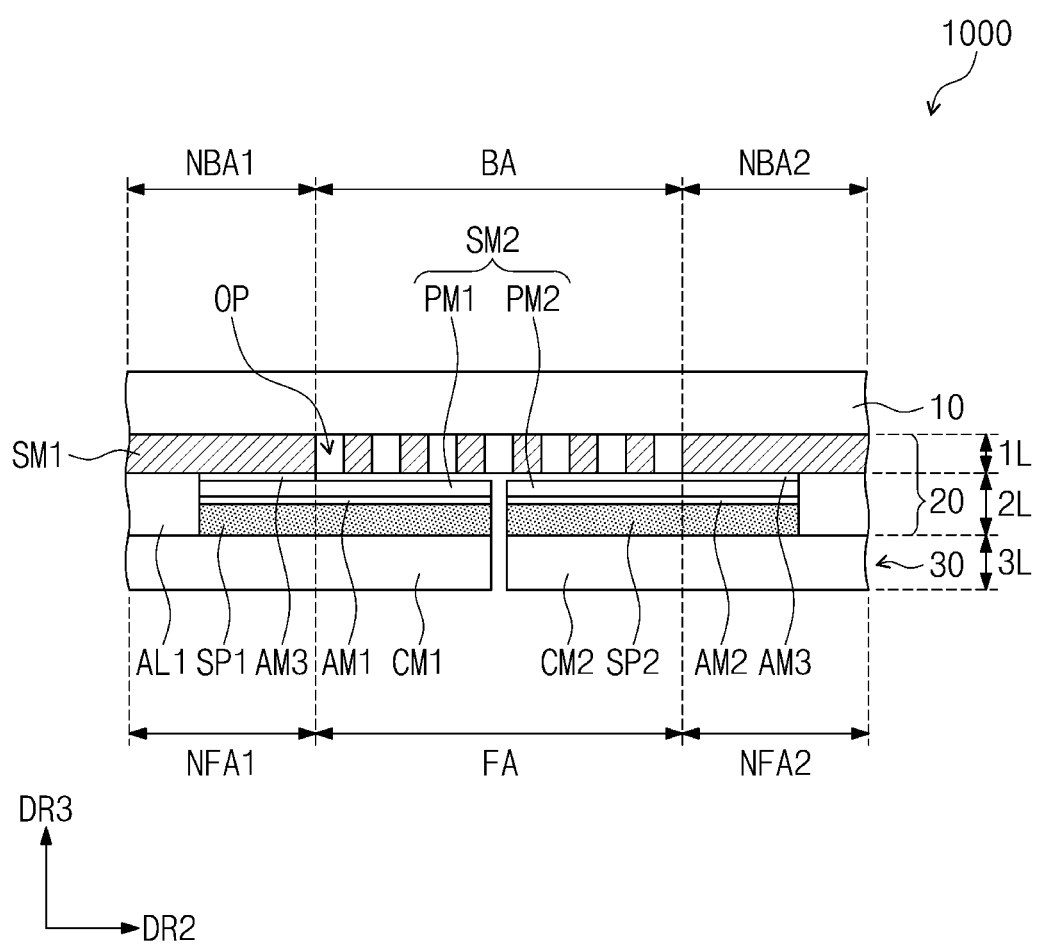
Figure 5C:
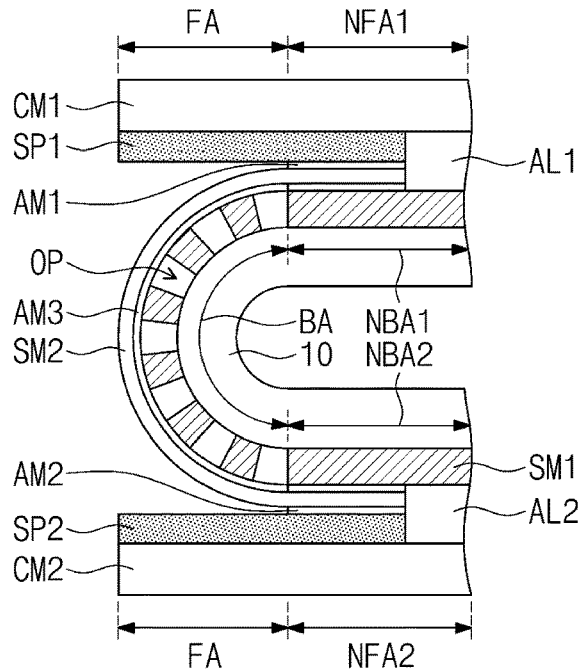
Figure 5D:
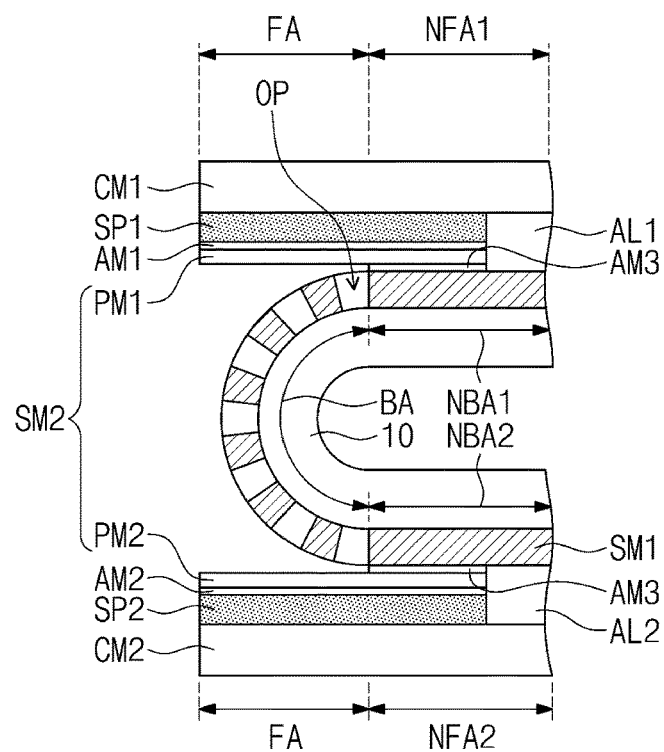

FIGS. 5A and 5B are cross-sectional views illustrating a display device 1000 which is unfolded or flat. FIGS. 5C and 5D are cross-sectional views respectively illustrating an end portion of the display device 1000 in FIGS. 5A and 5B which is folded.

Referring to FIGS. 5A and 5C, the display device 1000 includes a first module 10, a first support member SM1, a second support member SM2, a first support plate SP1, and a second support plate SP2. In an embodiment, the display device 1000 may further include a first adhesive member AM1, a second adhesive member AM2, and a third adhesive member AM3. In an embodiment, the display device 1000 may further include a first cover member CM1 and a second cover member CM2. In an embodiment, the display device 1000 may further include a first adhesive layer AL1 and a second adhesive layer AL2.

The first module 10 includes a display module 100. In FIG. 5A, functional layers other than the display module 100 are omitted. Thus, the first module 10 in FIG. 5A may represent the display module 100. A first non-folding area NFA1, a second non-folding area NFA2 and a folding area FA may be defined in the display module 100. The folding area FA may be positioned between the first non-folding area NFA1 and the second non-folding area NFA2.

The first support member SM1 may be disposed below the display module 100. The first support member SM1 may be bendable or foldable together with the display module 100. The first support member SM1 may be a metal plate. The first support member SM1 may include stainless steel, aluminum, or an alloy thereof. The strength (e.g., mechanical strength) of the first support member SM1 may be greater than the strength of the display module 100.

A bending area BA and first and second non-bending areas NBA1 and NBA2 which are adjacent to the bending area BA may be defined in the first support member SM1. The bending area BA may overlap the folding area FA. Also, the first and second non-bending areas NBA1 and NBA2 may overlap or correspond to the first and second non-folding areas NFA1 and NFA2, respectively. The first support member SM1 which is unbent has a flat shape, and the first support member SM1 which is bent at the bending area BA disposes the first non-folding area NFA1 and the second non-folding area NFA2 facing each other.

The first support member SM1 may be provided with a plurality of opening portions OP at the bending area BA. The plurality of opening portions OP may be defined between solid portions of the first support member SM1. Solid portions of the first support member SM1 define inner sidewalls of the first support member SM1 at the plurality of opening portions OP. The plurality of opening portions OP may extend through an entirety of a thickness of the first support member SM1 or may extend partially through the thickness of the first support member SM1. Each one of the plurality of opening portions OP may be open to outside the first support member SM1, at an upper surface of the first support member SM1 which faces the first module 10 and/or at a lower surface of the first support member SM1 which faces the third module 30.

The plurality of opening portions OP are spaced a predetermined distance from each other along the first support member SM1. The opening portions OP which are furthest apart from each other within the first support member SM1 may define the bending area BA. Referring to FIG. 5A, for example, two inner sidewalls of the first support member SM1 which are furthest apart from each other and define an opening portion OP may define a boundary of the bending area BA with a respective non-bending area. The bending area BA includes the plurality of opening portions OP and thus the first support member SM1 may have greater flexibility at the bending area BA than at the first non-bending area NBA1 and the second non-bending area NBA2.

The first support member SM1 is provided in each of the bending area BA, the first non-bending area NBA1 and the second non-bending area NBA2, to be commonly provided at each of the folding area FA, the first non-folding area NFA1 and the second non-folding area NFA2. The first support member SM1 is provided with the bending area BA overlapping the folding area FA, and supports the display module 100 at each of the folding area FA, the first non-folding area NFA1 and the second non-folding area NFA2. Accordingly, the first support member SM1 may facilitate the folding of the display device 1000 and prevent foreign substances from being introduced into the display module 100.

The second support member SM2 may be disposed below the first support member SM1. The second support member SM2 may have a bar shape and include a film or a cushion. A bar shape may be defined by a dimension of the second support member SM2 which is smaller than a dimension of the first support member SM1, along a same direction. Referring to FIGS. 5A and 5B, for example, since a maximum dimension of the second support member SM2 along the second direction DR2 is smaller than a maximum dimension of the first support member SM1, the first support member SM1 extends further than ends of the second support member SM2 along the second direction DR2. For a same distance along the first direction DR1, since the second support member SM2 is smaller than the first support member SM1 along the second direction DR2, the second support member defines a bar shape. Referring to FIG. 5B, each of the first part PM1 and the second part PM2 may have an individual bar shape.

The second support member SM2 may support the bending area BA, a portion of the first non-bending area NBA1, and a portion of the second non-bending area NBA2. That is, the second support member SM2 may overlap the bending area BA, the portion of the first non-bending area NBA1, and the portion of the second non-bending area NBA2. The portion of the first non-bending area NBA1 and the portion of the second non-bending area NBA2 may be portions adjacent to the bending area BA, such as extending directly therefrom. The second support member SM2 may be bendable together with the first support member SM1 and the display module 100.

The second support member SM2 may include a sponge, foam, a urethane resin, or the like. The second support member SM2 may be provided or formed as a single body which is common to each of the bending area BA, the portion of the first non-bending area NBA1, and the portion of the second non-bending area NBA2, and support the bending area BA of the first support member SM1. Thus, pressing and plastic deformation of the display module 100 and the first support member SM1 along the thickness direction may be reduced or effectively prevented owing to the second support member SM2 corresponding to the bending area BA. The deformation of the display module 100 and the first support member SM1 may occur due to pressure applied thereto along the thickness direction, such as from an external force and/or by the repetition of folding and unfolding operations.

The first support plate SP1 and the second support plate SP2 may be disposed below the second support member SM2. The first support plate SP1 and the second support plate SP2 may be spaced apart from each other. The display device 1000 which is unfolded disposes the first support plate SP1 and the second support plate SP2 disconnected from each other at the bending area BA. The first support plate SP1 may overlap portions of the bending area BA and the first non-bending area NBA1. The second support plate SP2 may overlap portions of the bending area BA and the second non-bending area NBA2. More particularly, the first support plate SP1 may support the first non-bending area NBA1 and a portion corresponding to about a first half of the bending area BA which is adjacent to the first non-bending area NBA1. Also, the second support plate SP2 may support the second non-bending area NBA2 and a portion corresponding to about a second half of the bending area BA which is adjacent to the second non-bending area NBA2.

Each of the first support plate SP1 and the second support plate SP2 may be a metal plate. Each of the first support plate SP1 and the second support plate SP2 may include stainless steel, aluminum, or an alloy thereof. Each of the first support plate SP1 and the second support plate SP2 may include or be made of the same material as the first support member SM1. Each of the first support plate SP1 and the second support plate SP2 may have the same thickness as the first support member SM1. In an embodiment, for example, each of the first support plate SP1, the second support plate SP2, and the first support member SM1 may have the thickness of about 0.08 millimeter (mm) to about 0.15 mm. In conjunction with the second support member SM2, the first and second support plates SP1 and SP2 may reduce or effectively prevent pressing of the display module 100 and the first support member SM1 which are unfolded. Also, deformation of the display module 100 and/or the first support member SM1 caused by such pressing may be reduced or effectively prevented.

In an embodiment, the first adhesive member AM1 may be disposed between the second support member SM2 and the first support plate SP1, and may overlap the first non-bending area NBA1. The second adhesive member AM2 may be disposed between the second support member SM2 and the second support plate SP2, and may overlap the second non-bending area NBA2. The third adhesive member AM3 may be disposed between the first support member SM1 and the second support member SM2. A single one of the third adhesive member AM3 may be disposed between the first support member SM1 and the second support member SM2, such as to be commonly disposed in each of the bending area BA, the first non-bending area NBA1, and the second non-bending area NBA2. Each of the first to third adhesive members AM1, AM2, and AM3 may include a pressure sensitive adhesive ("PSA"), an optical clear adhesive ("OCA"), or an optical clear resin ("OCR").

Each of the first to third adhesive members AM1, AM2, and AM3 defines an upper surface facing the first module 10 and a lower surface facing the third module 30. Both the upper and lower surfaces of each of the first to third adhesive members AM1, AM2, and AM3 may be adhesive to define an adhesive force relative to a component or layer adjacent thereto. An adhesive force may be defined at an interface of a respective surface of the first to third adhesive members AM1, AM2, and AM3, and a component or layer adjacent thereto. In an embodiment, for example, each of the first to third adhesive members AM1, AM2, and AM3 may be a double sided adhesive tape. In an embodiment, the first to third adhesive members AM1, AM2, and AM3 may be omitted.

In an embodiment, the first cover member CM1 may be disposed below the first support plate SP1, and the second cover member CM2 may be disposed below the second support plate SP2. The first cover member CM1 and the second cover member CM2 may be spaced apart from each other. The display device 1000 which is unfolded disposes the first cover member CM1 and the second cover member CM2 disconnected from each other at the bending area BA. In the display device 1000 which is unfolded, the distance between the first cover member CM1 and the second cover member CM2 may be equal to the distance between the first support plate SP1 and the second support plate SP2. That is, the first support member SM1 which is unbent disposes the first cover member CM1 and the second cover member CM2 spaced apart from each other by a first distance, and the first support plate SP1 and the second support plate SP2 spaced apart from each other by a second distance, where the first distance is equal to the second distance.

The first adhesive layer AL1 may be disposed between the first cover member CM1 and the first support member SM1. The second adhesive layer AL2 may be disposed between the second cover member CM2 and the first support member SM1. In an embodiment, the first adhesive layer AL1 may overlap a portion of the first non-bending area NBA1 other than the portion of the first non-bending area NBA1 overlapped by other components or layers within the second layer 2L. Also, the second adhesive layer AL2 may overlap a portion of the second non-bending area NBA2 other than the portion of the second non-bending area NBA2 overlapped by other components or layers within the second layer 2L. The first adhesive layer AL1 and the second adhesive layer AL2 may respectively extend from ends of the second support member SM2, the first to third adhesive members AM1, AM2 and AM3, the first support plate SP1 and the second support plate SP2.

The first adhesive layer AL1 and the second adhesive layer AL2 may be disposed between a same one of the first support member SM1, and the first and second cover members CM1 and CM2, respectively. Within the second layer 2L, the second support member SM2, and the first and second support plates SP1 and SP2, may be stacked along the thickness direction, and be respectively disposed between the first adhesive layer AL1 and the second adhesive layer AL2 in a same plane. The thickness of each of the first adhesive layer AL1 and the second adhesive layer AL2 may be equal to a sum of the thickness of the second support member SM2 and the thickness of the first support plate SP1 and/or the thickness of the second support member SM2 and the thickness of the second support plate SP2. In another embodiment, the thickness of each of a first adhesive layer AL1 and a second adhesive layer AL2 may be equal to a sum of the thickness of the second support member SM2, and respective ones among the thickness of the first support plate SP1 or the second support plate SP2, the thickness of the first adhesive member AM1 or the second adhesive member AM2, and the thickness of the third adhesive member AM3.

Referring to FIGS. 5B and 5D, a second support member SM2 may include a first part PM1 (e.g., first portion) and a second part PM2 (e.g., second portion). The first part PM1 may overlap or correspond to the first support plate SP1, and the second part PM2 may overlap or correspond to the second support plate SP2. The display device 1000 which is unfolded disposes the first part PM1 and the second part PM2 disconnected from each other at the bending area BA. In the display device 1000 which is unfolded, the distance between the first part PM1 and the second part PM2 may be equal to the distance between the first support plate SP1 and the second support plate SP2.

Each of the first part PM1 and the second part PM2 may include metal. In an embodiment, for example, the first part PM1 and the second part PM2 may include stainless steel, aluminum, or an alloy thereof. In the present embodiment, a third adhesive member AM3 may be disposed in plurality respectively corresponding to a portion of the first non-bending area NBA1 and a portion of the second non-bending area NBA2, except for a region corresponding to the bending area BA, between the first support member SM1 and the second support member SM2. Also, in the present embodiment, the first adhesive member AM1 may be disposed to overlap or correspond to the first part PM1, and be between the first part PM1 of the second support member SM2 and the first support plate SP1. The second adhesive member AM2 may be disposed to overlap or correspond to the second part PM2, and be between the second part PM2 of the second support member SM2 and the second support plate SP2.

In FIGS. 5A to 5D, the first support member SM1 may be unfolded (FIGS. 5A and 5B) to have a flat shape or may be folded (FIGS. 5C and 5D) to have a bent shape in which the first non-folding area NFA1 and the second non-folding area NFA2 face each other along a thickness direction of the display device 1000. FIGS. 5A and 5B may represent the display module 100 which is unfolded or unbent, and FIGS. 5C and 5D may represent the display module 100 which is folded or bent. The folding area FA and the bending area BA are disposed at the end portion of the display module 100 which is folded or bent, to correspond to the end portion of the display device 1000 which is folded or bent.

FIGS. 6A to 6F are cross-sectional views of an embodiment of a display device 1000.

When describing FIGS. 6A to 6F, the description duplicated with FIGS. 5A to 5D will be omitted.

Figure 6A:
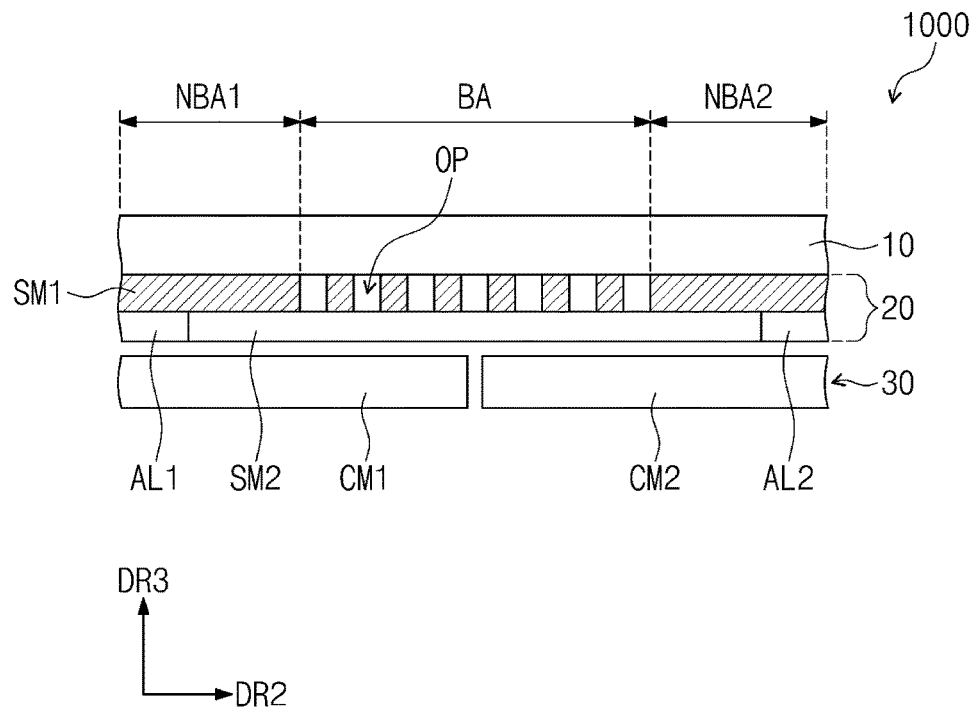
FIGS. 6A to 6F are cross-sectional views of embodiments of a display device.
Figure 6B:
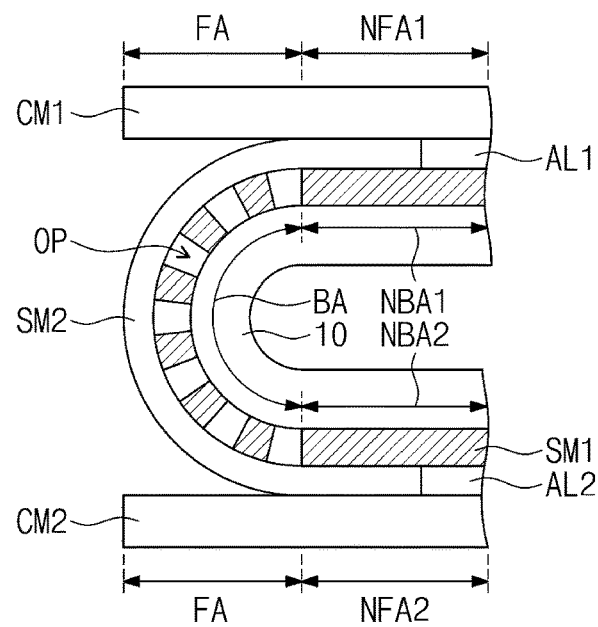

FIGS. 6A and 6B are cross-sectional views illustrating an embodiment of a display device 1000. The display device 1000 is unfolded in FIG. 6A, and the display device 1000 is folded in FIG. 6B. Referring to FIGS. 6A and 6B, a display device 1000 may include a display module 100, a first support member SM1, and a second support member SM2. In an embodiment, the display device 1000 may further include a first cover member CM1 and a second cover member CM2. In an embodiment, the display device 1000 may further include a first adhesive layer AL1 and a second adhesive layer AL2.

In FIGS. 6A and 6B, the second support member SM2 is disposed below the first support member SM1 and supports a bending area BA, a portion of a first non-bending area NBA1, and a portion of a second non-bending area NBA2. The second support member SM2 may be attached to a bottom surface of the first support member SM1. In detail, an upper surface of the second support member SM2 which faces the first module 10 may form an interface with the bottom surface of the first support member SM1 which faces the third module 30. As forming an interface, an intervening component or layer may be absent or omitted from between the first support member SM1 and the second support member SM2. The second support member SM2 may be disposed in the same plane as the first adhesive layer AL1 and the second adhesive layer AL2. That is, the second support member SM2, the first adhesive layer AL1 and the second adhesive layer AL2 may be coplanar with each other.

Figure 6C:
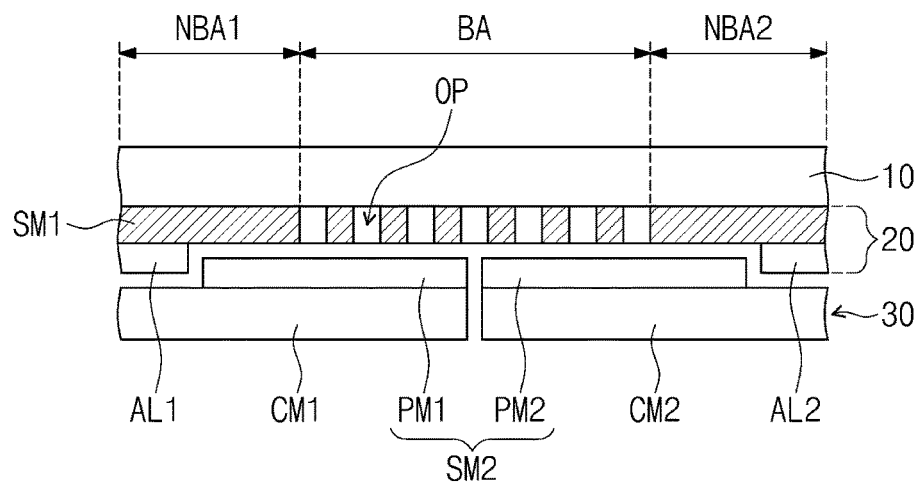
Figure 6D:
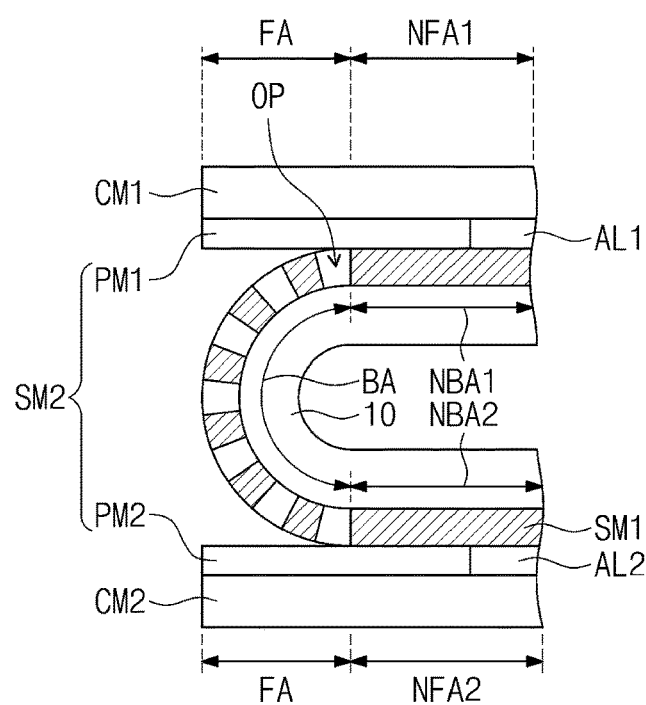

In FIGS. 6C and 6D, a second support member SM2 may include a first part PM1 and a second part PM2 which are spaced apart from each other (e.g., disconnected) at the bending area BA. The first part PM1 may support a first portion of the bending area BA and a portion of the first non-bending area NBA1. The second part PM2 may support a second portion of the bending area BA and a portion of the second non-bending area NBA2. In an embodiment, the first part PM1 and the second part PM2 may be attached to the top surfaces of a first cover member CM1 and a second cover member CM2, respectively. The first part PM1 and the second part PM2 may be attached to the top surfaces of the first cover member CM1 and the second cover member CM2 through an adhesive or a bonding agent, respectively, or attached directly thereto (e.g., forming an interface therewith). That is, the first part PM2 of the second support member SM2 forms an interface with the top surface of the first cover member CM1, and the second part PM2 of the second support member SM2 forms an interface with the top surface of the second cover member CM2. The first support member SM1 includes a bottom surface facing the second support member SM2, and the first part PM1 and the second part PM2 of the second support member SM2 respectively form an interface with the bottom surface of the first support member SM1.

The first adhesive layer AL1 and the second adhesive layer AL2 may form a step difference with the lower surface of the first support member SM1. A thickness of the first part PM1 and the second part PM2 may be equal to a height of the step difference formed by the first adhesive layer AL1 and the first support member SM1 and by the second adhesive layer AL2 and the first support member SM1. Each of the first part PM1 and the second part PM2 may be a stepped portion compensation member for compensating a stepped portion due to the first adhesive layer AL1 and the second adhesive layer AL2, relative to the first support member SM1. Here, the stepped portion compensation member is not particularly limited, and may include various types of applicable compensation tapes and/or adhesive tape.

Figure 6E:
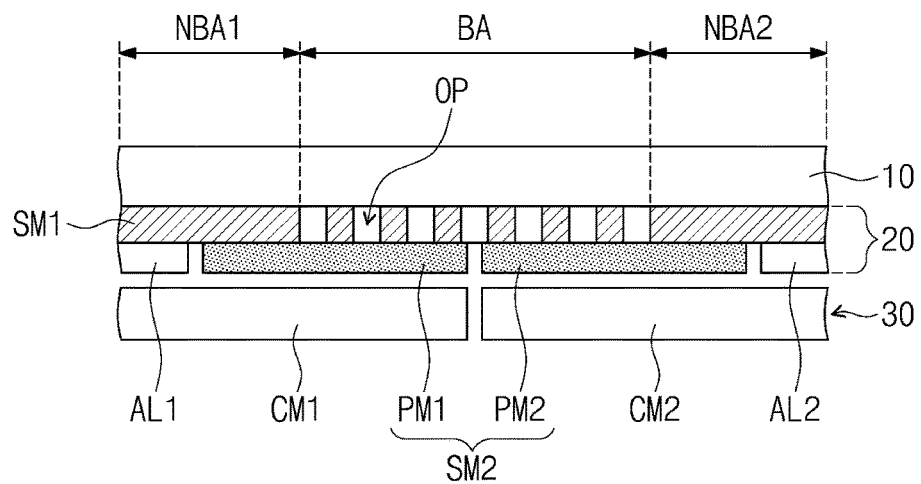
Figure 6F:
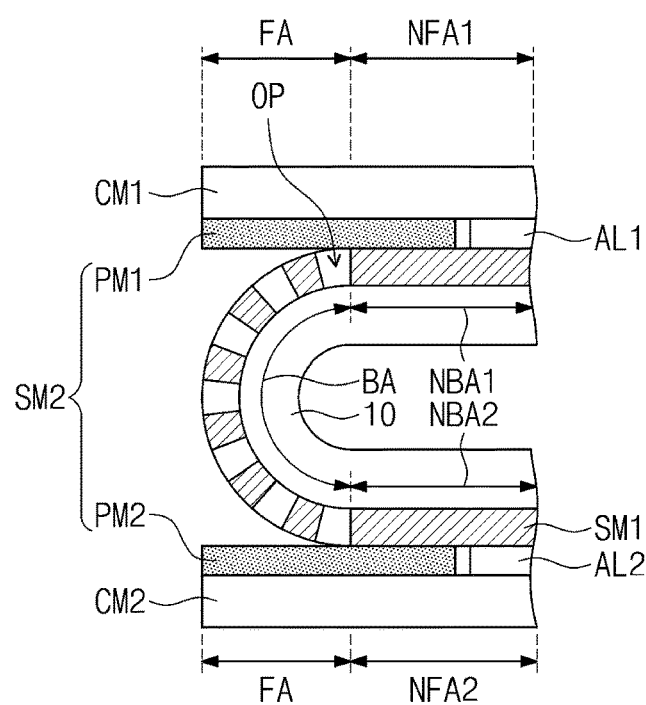

In FIGS. 6E and 6F, each of a first part PM1 and a second part PM2 may include metal. In an embodiment, the first part PM1 and the second part PM2 may include stainless steel, aluminum, or an alloy thereof. The first part PM1 and the second part PM2 may be attached to the bottom surface of the first support member SM1. In an embodiment, for example, the first part PM1 and the second part PM2 may be attached to the bottom surface of the first support member SM1 through a direct-bond such as by welding or thermal welding. In detail, upper surfaces of the first part PM1 and the second part PM2 which face the first module 10 may form interfaces with the bottom surface of the first support member SM1 which faces the third module 30. In an embodiment, the first part PM1 and the second part PM2 may have the same material as the first support member SM1.

In a direction along the first support member SM1, the first part PM1 and the second part PM2 may be spaced apart from a first adhesive layer AL1 and a second adhesive layer AL2, respectively. The first part PM1, the second part PM2, the first adhesive layer AL1 and the second adhesive layer AL2 may be disposed in a same plane as each other (e.g., coplanar with each other).

Figure 7A:
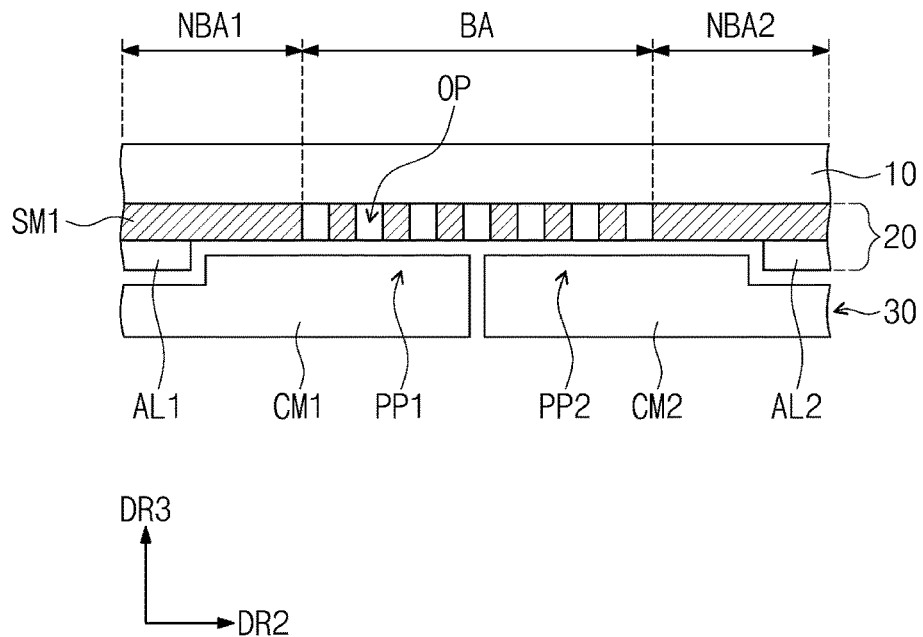
FIGS. 7A and 7B are cross-sectional views of an embodiment of a display device.
Figure 7B:
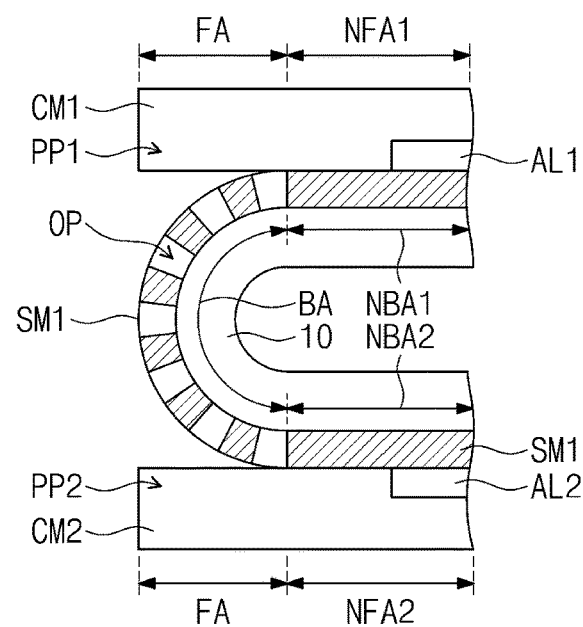

FIGS. 7A and 7B are cross-sectional views of an embodiment of a display device 1000.

FIG. 7A represents the display device 1000 which is unfolded, and FIG. 7B represents the display device 1000 which is folded. Referring to FIGS. 7A and 7B, a display device 1000 includes a display module 100, a first support member SM1, a first cover member CM1, a second cover member CM2, a first adhesive layer AL1, and a second adhesive layer AL2. The first cover member CM1 includes a first protruding part PP1 (e.g., first protrusion) for supporting portions of a bending area BA and a first non-bending area NBA1 of the first support member SM1, and the second cover member CM2 includes a second protruding part PP2 (e.g., second protrusion) for supporting portions of the bending area BA and a second non-bending area NBA2. More particularly, the first cover member CM1 supports a region of the bending area BA which is adjacent to the first non-bending area NBA1, and the second cover member CM2 supports a region of the bending area BA which is adjacent to the second non-bending area NBA2.

In an embodiment, the first protruding part PP1 may be coplanar with the first adhesive layer AL1 and the second protruding part PP2 may be coplanar with the second adhesive layer AL2. The first protruding part PP1 has the same thickness as the second protruding part PP2, and the thickness may be equal to the thickness of each of the first adhesive layer AL1 and the second adhesive layer AL2. The first cover member CM1 and the second cover member CM2 may include metal or plastic. A portion of the first cover member CM1 which is coplanar with the first adhesive layer AL1 and/or the second adhesive layer AL2 defines the first protruding part PP1. Similarly, a portion of the second cover member CM2 which is coplanar with the first adhesive layer AL1 and/or the second adhesive layer AL2 defines the second protruding part PP2.

One or more embodiment of the invention includes the first support member SM1 in which the bending area BA is defined to correspond to the folding area FA of the display module, and thus the introduction of foreign substances into the display module 100 may be minimized. Also, the second support member SM2, the first support plate SP1 and the second support plate SP2 are provided corresponding to the bending area BA, and thus pressing and/or deformation at the folding area FA of the display module 100 and the bending area BA of the first support member SM1 may be reduced or effectively prevented. Therefore, the present disclosure may provide the display device 1000 having the improved product reliability.

As described above, embodiments were disclosed in the drawings and the specification. While specific terms were used, they were not used to limit the meaning or the scope of the invention described in the claims but merely used to explain embodiments of the invention. Accordingly, those skilled in the art will understand that various modifications and other equivalent embodiments are also possible. Hence, the real protective scope of the present disclosure shall be determined by the technical scope of the accompanying the claims.

What is claimed is:

1. A display device comprising:
   a display module including:
      a folding area at which the display module is foldable, and
      a first non-folding area and a second non-folding area respectively extended from the folding area in opposite directions;
   a first support member bendable together with the display module, the first support member including:

a bending area at which the first support member is bendable, the bending area corresponding to the folding area,
a first non-bending area corresponding to the first non-folding area, and
a second non-bending area corresponding to the second non-folding area; and
a support layer facing the display module with the first support member therebetween, the support layer including:
a second support member in the bending area, the first non-bending area and the second non-bending area;
a first support plate facing the first support member with the second support member therebetween, the first support plate in the bending area and the first non-bending area; and
a second support plate facing the first support member with the second support member therebetween, the second support plate in the bending area and the second non-bending area,
wherein the second support plate is disconnected from the first support plate at the bending area.

2. The display device of claim 1, further comprising a plurality of openings defined in the first support member at the bending area thereof and spaced apart from each other along the bending area,
wherein openings which are spaced furthest apart from each other define the bending area of the first support member.

3. The display device of claim 1, wherein
each of the first support member, the first support plate and the second support plate has a thickness, and
the thickness of the first support member, the first support plate and the second support plate are the same as each other.

4. The display device of claim 1, wherein each of the first support member, the first support plate, and the second support plate has a thickness of about 0.08 millimeter to about 0.15 millimeter.

5. The display device of claim 1, wherein
the first non-bending area, the bending area and the second non-bending area are arranged in order along a first direction,
each of the first support member and the second support member has a dimension along the first direction and includes a film or a cushion, and
the dimension of the second support member is smaller than the dimension of the first support member.

6. The display device of claim 1, wherein
the second support member is disconnected at the bending area to define a first portion and a second portion spaced apart from each other at the bending area, and
the first portion corresponds to the first support plate and the second portion corresponds to the second support plate.

7. The display device of claim 6, wherein each of the first portion and the second portion comprises metal.

8. The display device of claim 1, further comprising:
a first adhesive member between the second support member and the first support plate and corresponding to the first non-bending area,
a second adhesive member between the second support member and the second support plate and corresponding to the second non-bending area, and
a third adhesive member facing the first adhesive member with the second support member therebetween and facing the second adhesive member with the second support member therebetween.

9. The display device of claim 1, wherein
the first support member which is unbent has a flat shape, and
the first support member which is bent at the bending area disposes the first non-folding area and the second non-folding area facing each other.

10. The display device of claim 1, further comprising a cover layer facing the first support member with each of the second support member, the first support plate and the second support plate therebetween,
wherein
the cover layer is disconnected at the bending area to define a first cover member and a second cover member spaced apart from each other at the bending area, and
the first cover member corresponds to the first support plate and the second cover member corresponds to the second support plate.

11. The display device of claim 10, wherein
the first support member which is unbent disposes:
the first cover member and the second cover member spaced apart from each other by a first distance, and
the first support plate and the second support plate spaced apart from each other by a second distance, and
the first distance is equal to the second distance.

12. The display device of claim 10, further comprising:
a first adhesive layer and a second adhesive layer each coplanar with the second support member and spaced apart from each other by the second support member,
the first adhesive layer in the first non-bending area and between the first cover member and the first support member, and
the second adhesive layer in the second non-bending area and between the second cover member and the first support member.

13. The display device of claim 12, wherein
each of the second support member, the first support plate, the second support plate, the first adhesive layer and the second adhesive layer has a thickness, and
the thickness of the first adhesive layer is equal to a sum of thicknesses of the second support member and the first support plate, or
the thickness of the second adhesive layer is equal to a sum of thicknesses of the second support member and the second support plate.

14. A display device comprising:
a display module including:
a folding area at which the display module is foldable, and
a first non-folding area and a second non-folding area respectively extended from the folding area in opposite directions;
a first support member bendable together with the display module, the first support member including:
a bending area at which the first support member is bendable, the bending area corresponding to the folding area,
a first non-bending area corresponding to the first non-folding area,
a second non-bending area corresponding to the second non-folding area are defined, and
a plurality of openings defined in the first support member at the bending area thereof and spaced apart from each other along the bending area, wherein openings which are spaced furthest apart from each other define the bending area of the first support member;

a second support member facing the display module with the first support member therebetween, wherein:

the second support member is in the bending area, the first non-bending area and the second non-bending area and is disconnected at the bending area to define a first portion and a second portion which are spaced apart from each other at the bending area, and the second support member includes the first portion in the bending area and the first non-bending area, and the second portion in the bending area and the second non-bending area; and a cover layer facing the first support member with the second support member therebetween, wherein:

the cover layer is disconnected at the bending area to define a first cover member and a second cover member spaced apart from each other at the bending area, the first cover member and the second cover member each include a top surface facing the second support member, the first portion of the second support member forms an interface with the top surface of the first cover member, and the second portion of the second support member forms an interface with the top surface of the second cover member.

15. The display device of claim 14, wherein each of the first portion and the second portion of the second support member comprises metal.

16. The display device of claim 15, wherein the first support member includes a bottom surface facing the second support member, and the first portion and the second portion of the second support member respectively form an interface with the bottom surface of the first support member.

17. A display device comprising:

a display module including:

a folding area at which the display module is foldable, and a first non-folding area and a second non-folding area respectively extended from the folding area in opposite directions;

a first support member bendable together with the display module, the first support member including:

a bending area at which the first support member is bendable, the bending area corresponding to the folding area, a first non-bending area corresponding to the first non-folding area, and a second non-bending area corresponding to the second non-folding area; and a cover layer facing the display module with the first support member therebetween, the cover layer including a first cover member in the first non-bending area and the bending area;

a second cover member in the second non-bending area and the bending area, the second cover member disconnected from the first cover member at the bending area;

a first adhesive layer which is in the first non-bending area and coplanar with the first cover member, wherein the first adhesive layer in the first non-bending area is between the first support member and the first cover member; and a second adhesive layer which is in the second non-bending area and coplanar with the second cover member, wherein the second adhesive layer in the second non-bending area is between the first support member and the second cover member, wherein the first cover member comprises a first protrusion extended toward the first support member, wherein the first protrusion is coplanar with the first adhesive layer and in each of the bending area and the first non-bending area, and the second cover member comprises a second protrusion extended toward the first support member, wherein the second protrusion is coplanar with the second adhesive layer and in each of the bending area and the second non-bending area.

* * * * *